United States Patent [19]

Nebelung

[11] Patent Number: 4,547,212

[45] Date of Patent: Oct. 15, 1985

[54] TAKE-OUT MECHANISM FOR A GLASSWARE FORMING MACHINE

[75] Inventor: Hermann H. Nebelung, Zurich, Switzerland

[73] Assignee: Emhart Industries, Inc., Farmington, Conn.

[21] Appl. No.: 666,029

[22] Filed: Oct. 29, 1984

[30] Foreign Application Priority Data

Nov. 11, 1983 [GB] United Kingdom ............... 8330185

[51] Int. Cl.[4] .............................................. C03B 9/44
[52] U.S. Cl. ........................................ 65/260; 65/239; 65/241
[58] Field of Search ........................... 65/239, 241, 260

[56] References Cited

U.S. PATENT DOCUMENTS

| | | | |
|---|---|---|---|
| 1,835,570 | 12/1931 | Lorenz | 65/260 X |
| 2,253,155 | 8/1941 | Wadman et al. | 65/260 |
| 3,175,704 | 3/1965 | McCreery | 65/260 X |
| 3,401,029 | 9/1968 | Roberts | 65/260 |
| 4,255,179 | 3/1981 | Foster | 65/241 X |

*Primary Examiner*—Arthur Kellogg
*Attorney, Agent, or Firm*—H. Samuel Kieser

[57] ABSTRACT

A take-out mechanism is turned about a horizontal axis between positions at which gripper members thereof can grip or release articles of glassware. The mechanism comprises an arm, a shaft on which the arm is mounted for rotation about the horizontal axis and moving means for turning the arm about the axis. The moving means comprises a hydraulic piston and cylinder assembly comprising a piston, a first piston rod making a screw-threaded connection with an end cap of the cylinder so that movement of the piston causes it to turn, and a second piston rod connected to the arm to transmit rotation thereto.

6 Claims, 2 Drawing Figures

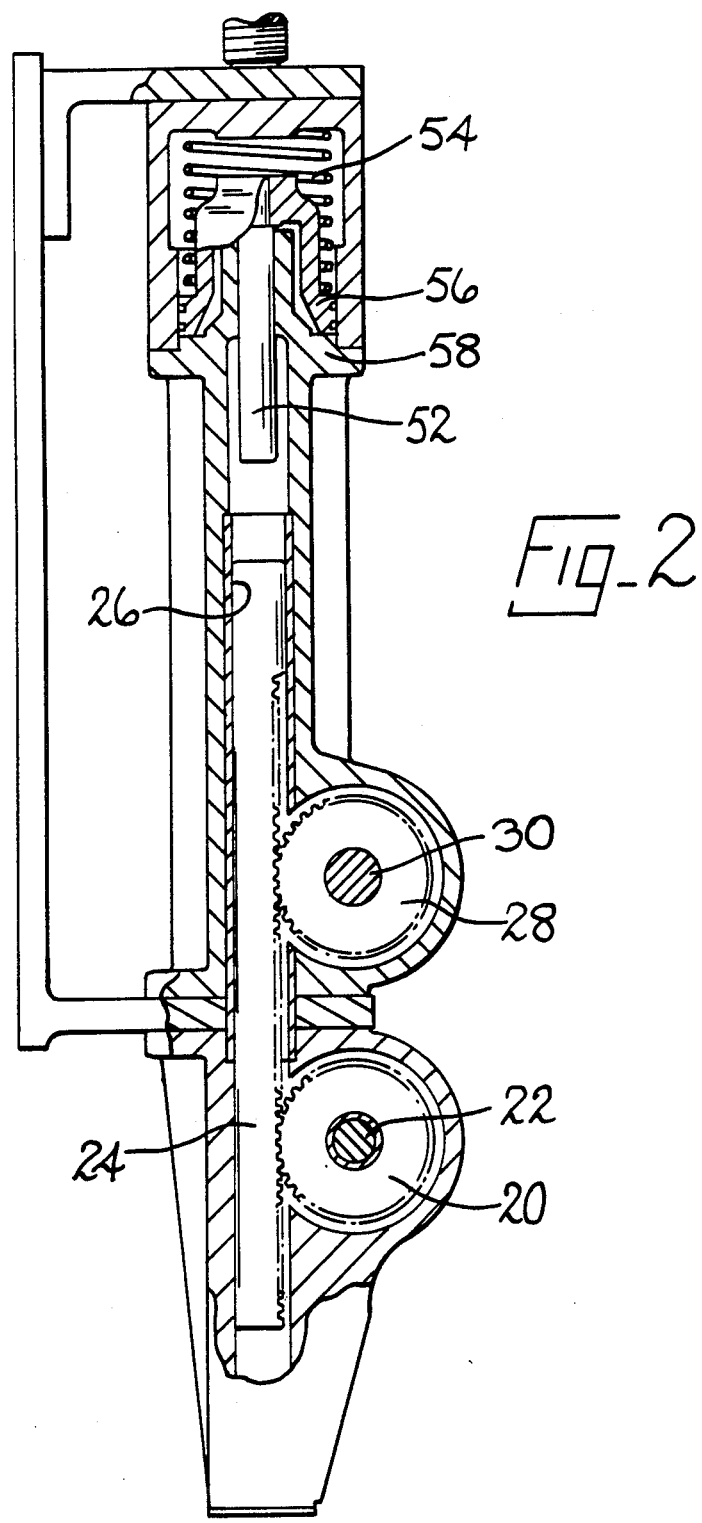
Fig_2

4,547,212

TAKE-OUT MECHANISM FOR A GLASSWARE FORMING MACHINE

BACKGROUND OF THE MACHINE

This invention is concerned with a take-out mechanism for a glassware forming machine comprising a carrier movable in an arcuate path between a first position at which gripper members supported by the carrier can grip an article of glassware and a second position at which the gripper members can release the article on to a support, an arm on which the carrier is mounted, and moving means operable to turn the arm about a horizontal axis to move the carrier along the arcuate path.

In glassware container forming machines, articles of glassware are blow moulded at a blow moulding station of the machine and then required to be removed from the moulds and positioned on a support, known as a dead plate, before being transferred to a conveyor for removal from the machine. In order to remove the articles of glassware from the moulds and position them on the dead plate, the machine has a take-out mechanism which supports gripper members, sometimes known as tongs, which grip an article of glassware in the mould and release it on to the dead plate.

Conventionally, the moving means of a take-out mechanism comprises a gear fixed to the arm and mounted to turn about a horizontal axis, a rack meshed with said gear, and driving means operable to move the rack past the gear so that the gear and the arm are caused to turn about said axis, the driving means comprising a piston and cylinder assembly having a piston rod attached to the rack so that motion of the piston in the cylinder brings about motion of the rack past the gear. So as not to interfere with other parts of the glassware forming machine, the rack, the cylinder of the piston and cylinder assembly and the piston rod thereof extend vertically and, since the stroke of the piston is the same length as the rack, the whole mechanism extends for a considerable distance and is undesirably bulky.

It is an object of the present invention to provide a take-out mechanism for a glassware forming machine in which the moving means for the arm is considerably less bulky than in conventional mechanisms.

BRIEF SUMMARY OF THE INVENTION

The invention provides a take-out mechanism for a glassware forming machine comprising a carrier movable in an arcuate path between a first position at which gripper members supported by the carrier can grip an article of glassware and a second position at which the gripper members can release the article on to a support, an arm on which the carrier is mounted, and moving means operable to turn the arm about a horizontal axis to move the carrier along the arcuate path, the moving means comprising a shaft on which the arm is mounted for rotation about a horizontal axis about which the arm turns, and a hydraulic piston and cylinder assembly operable to turn the arm about the horizontal axis, the hydraulic piston and cylinder assembly comprising a piston, a first piston rod projecting from the piston and making a screw-threaded connection with an end cap of the cylinder which is held against rotation, the screw-threaded connection being such that, when the piston moves along the cylinder, the piston is caused to turn about a horizontal axis of the cylinder, and a second piston rod projecting from the piston and making a connection with the arm such that, when the piston turns in the cylinder, the arm is caused to turn.

In a take-out mechanism in accordance with the last preceding paragraph, the cylinder of the hydraulic piston and cylinder assembly does not have to extend as far as in a conventional mechanism so that the total bulk of the driving means is reduced. The motion can be controlled by means of a 4-way servo valve in the circuit which supplies fluid to the assembly.

To enable the piston and cylinder to be displaced vertically from the shaft, the moving means may also comprise a gear fixed to the shaft, a further gear mounted for rotation about a further horizontal axis, the hydraulic piston and cylinder assembly being operable to turn said further gear about said further axis, and a rack meshed with both gears and operative, when said further gear is turned about the further axis, to cause the gear fixed to the shaft and the arm to turn about the first-mentioned horizontal axis.

In order to cushion the motion of the carrier towards its second position thereby reducing the possibility of damage to the articles, the rack may engage a spring-loaded plunger as the carrier is moved into its second position, which opposes the movement of the rack. The plunger may be operable, upon connection of both ends of the hydraulic cylinder of the assembly to exhaust, to move the rack so that the carrier is moved away from its second position. Thus, the plunger may provide "kick-back" removing the carrier from the second position so that the article released by the gripper members can be moved without risk of collision with the gripper members and, furthermore, reducing the time required to move the carrier to its first position when required as the carrier has already made a portion of the motion to its first position.

In order to further reduce the bulk of the driving means, the connection made by the second piston rod with the arm may be a screw-threaded connection of opposite hand to the connection between the first piston rod and the end cap. This arrangement allows the gear to be turned twice as fast as the piston so that the length of the cylinder of the hydraulic piston and cylinder assembly can be reduced.

In order to enable the first position of the carrier to be adjusted heightwise, an adjustable abutment may limit the stroke of the piston in the cylinder by engagement with the first piston rod.

BRIEF DESCRIPTION OF THE DRAWINGS

There now follows a detailed description, to be read with reference to the accompanying drawings, of a take-out mechanism for a glassware forming machine which is illustrative of the invention. It is to be understood that the illustrative take-out mechanism has been selected for description by way of example and not of limitation of the invention.

In the drawings:

FIG. 2 is a cross-sectional view taken on the line II—II in FIG. 1.

DETAILED DESCRIPTION OF PREFERRED EMBODIMENT OF THE INVENTION

Figure 1:
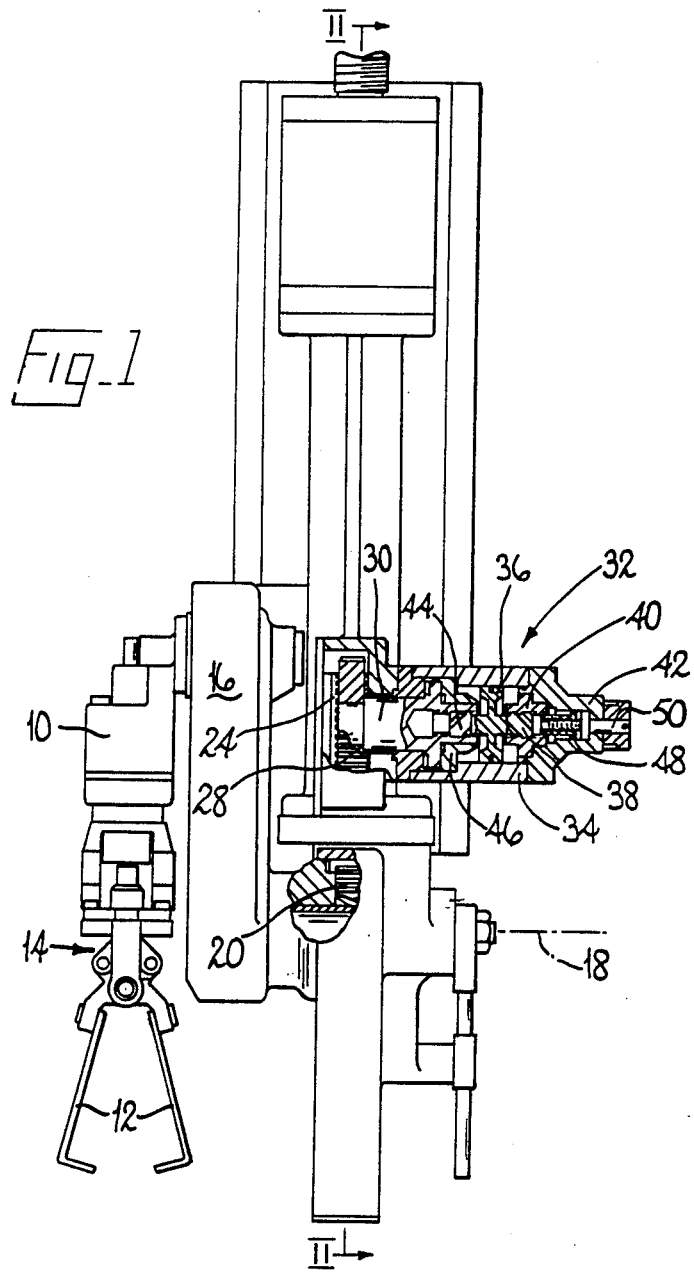
FIG. 1 is a front elevational view of the illustrative take-out mechanism, partly in section.

The illustrative take-out mechanism is for a glassware forming machine of the so-called "individual section" type and is operable to remove articles of glassware from a mould of the machine and position them on a dead plate thereof. The mechanism comprises a carrier 10 which is movable in an arcuate path between a first position at which gripper members 12 supported by the carrier 10 can grip an article of glassware and a second position at which the gripper members 12 can release the article on to a dead plate forming a support therefor. The carrier 10 is of conventional construction and comprises a piston and cylinder assembly operable to move the gripper members by means of a toggle arrangement 14 between an open condition thereof (shown in FIG. 1) and a closed condition (not shown) in which the gripper members 12 can grip an article of glassware, the gripping condition being reached by moving the gripper members 12 towards one another.

The illustrative take-out mechanism also comprises an arm 16 on which the carrier 10 is mounted. The arm 16 incorporates a mechanism of conventional type which maintains the carrier 10 and the gripper members 12 in vertical alignment during arcuate movement of the arm 16 about a horizontal axis. In FIG. 1, the arm is shown in a vertical condition which occurs when the carrier 10 is halfway between its first and its second positions and is travelling towards its first position with the gripper members 12 in an open condition.

The illustrative take-out mechanism also comprises moving means operable to turn the arm 16 about the horizontal axis which is indicated by the numeral 18 in FIG. 1 in order to move the carrier 10 along the arcuate path. The moving means comprises a fixed shaft 22 on which the arm is mounted for rotation about said horizontal axis 18, and a gear 20 fixed to the arm 16 and mounted to turn about said horizontal axis 18 on the shaft 22. The moving means also comprises a rack 24 which is mounted for vertical sliding movement in a guide 26 and is meshed with the gear 20 (see FIG. 2). The moving means also comprises driving means operable to move the rack 24 vertically past the gear 20 so that the gear 20 and the arm 16 are caused to turn about the axis 18. It should be noted that, in a modification of the illustrative take-out mechanism, the shaft 22 is fixed to the arm 16 and mounted for rotation about the axis 18, in this case, the driving means drives the shaft 22 directly.

The driving means of the moving means of the illustrative take-out mechanism comprises a gear 28 which is meshed with the rack 24, a shaft 30 on which the gear 28 is mounted, the shaft 30 being mounted to turn about a horizontal axis which is parallel to the axis 18, and a hydraulic piston and cylinder assembly 32 operable to turn the shaft 30 about its horizontal axis. The hydraulic piston and cylinder assembly 32 comprises a cylinder 34 and a piston 36 which is arranged to be moved back and forth within the cylinder 34 by application of hydraulic fluid under pressure to opposite ends of the cylinder 34. The assembly 32 also comprises a first piston rod 38 which projects from the piston 36 in a direction away from the gear 28 and makes a screw-threaded connection with an end cap 40 of the cylinder 34 which is held against rotation in a housing 42. The end cap 40 has a screw-threaded cylindrical recess therein in which the piston rod 38 which is externally screw-threaded is received. The screw-threaded connection between the piston rod 38 and the end cap 40 is such that, when the piston 36 moves along the cylinder 34 due to the application of hydraulic fluid under pressure thereto, the piston 36 is caused to turn about a longitudinal axis of the cylinder 34 which is aligned with the longitudinal axis of the shaft 30. The assembly 32 also comprises a second piston rod 44 which projects from the piston 36 and makes a connection with the shaft 30. The connection between the shaft 30 and the piston rod 44 is such that, when the piston 36 turns in the cylinder 34, the shaft 30 is caused to turn turning the gear 28 and moving the rack 24. This causes the gear 20 to turn moving the arm 16 about the axis 18 to move the carrier 10 between its first and its second positions. The connection between the second piston rod 44 and the shaft 30 is a screw-threaded connection of opposite hand to the connection between the first piston rod 38 and the end cap 40. The shaft 30 projects through an end cap 46 of the cylinder 34 and is mounted for turning motion in bearings supported by the end cap 46. Within the cylinder 34, an end portion of the shaft 30 has an internally screw-threaded recess in which the piston rod 44 which is externally screw-threaded is threadedly received. Because of the opposite handedness of the screw-threaded connections between the piston rods 38 and the end cap 40 and the piston rod 44 and the shaft 30, when the piston 36 turns in the cylinder 34, the shaft 30 is caused to turn twice as fast as the piston 36.

In order to enable the first position of the carrier 10 to be adjusted, the housing 42 of the assembly 32 supports an adjustable abutment 48 which is arranged to limit the stroke of the piston 36 in the cylinder 34 by engagement with the piston rod 38. The abutment 48 is threadedly received in a recess in the housing 42 and projects into the recess in the end cap 40 so that an end portion of the piston rod 38 will engage the abutment 48 and the piston 36 will be prevented from further movement away from the gear 28. The abutment 48 is connected to a spindle 50 which is outside the housing 42 and can be turned to move the abutment 48 to adjust the first position of the carrier 10.

The illustrative take-out mechanism also comprises a plunger 52 which is mounted in alignment with the rack 24. The plunger is urged by a spring 54 towards the rack 24 to a limit provided by engagement of a flange portion 56 of the plunger 52 on which the spring 54 acts with a shoulder 58 of a housing of the illustrative take-out mechanism. The arrangement is such that, as the carrier 10 is moved into its second position, the rack 24, which is being moved upwardly in this movement, engages the spring loaded plunger 52 and the plunger opposes the movement of the rack 24 thereby cushioning the end portion of its motion since the hydraulic assembly 32 must overcome the resistance of the spring 54. When the carrier 10 is in its second position and the gripper members 12 have released the article which they carried to the second position, both ends of the hydraulic cylinder 34 are connected to exhaust so that the piston 36 is free to move in the cylinder 34 and, thereupon, the plunger 52 is operable to move the rack 24 downwardly so that the carrier 10 is moved away from its second position. This arrangement means that the carrier 10 is moved part of the way from its second position to its first position and therefore will take less time to reach its first position when the assembly 32 is activated to bring about movement of the carrier. Furthermore, the operation of the plunger 52 ensures that the carrier 10 leaves its second position rapidly so that there is no danger of collision between the gripper members 12 and the articles which they have released when the articles are subsequently moved horizontally.

The illustrative take-out mechanism has a moving means which is considerably less bulky than those of conventional take-out mechanisms which is of great advantage in a machine of the individual section type where space is very much at a premium.

I claim:

1. A take-out mechanism for a glassware forming machine comprising a carrier movable in an arcuate path between a first position at which gripper members supported by the carrier can grip an article of glassware and a second position at which the gripper members can release the article on to a support, an arm on which the carrier is mounted, and moving means operable to turn the arm about a horizontal axis to move the carrier along the arcuate path, the moving means comprising a shaft on which the arm is mounted for rotation about the horizontal axis about which the arm turns, and a hydraulic piston and cylinder assembly operable to turn the arm about the horizontal axis, the hydraulic piston and cylinder assembly comprising a piston, a first piston rod projecting from the piston and making a screw-threaded connection with an end cap of the cylinder which is held against rotation, the screw-threaded connection being such that, when the piston moves along the cylinder, the piston is caused to turn about a horizontal axis of the cylinder, and a second piston rod projecting from the piston and making a connection with the arm such that, when the piston turns in the cylinder, the arm is caused to turn.

2. A take-out mechanism according to claim 1, wherein the moving means also comprises a gear fixed to the shaft, a further gear mounted for rotation about a further horizontal axis, the hydraulic piston and cylinder assembly being operable to turn said further gear about said further axis, and a rack meshed with both gears and operative, when said further gear is turned about the further axis, to cause the gear fixed to the shaft and the arm to turn about the first-mentioned horizontal axis.

3. A take-out mechanism according to claim 2, wherein the rack engages a spring-loaded plunger as the carrier is moved into its second position, which opposes the movement of the rack.

4. A take-out mechanism according to claim 3 wherein the plunger is operable, upon connection of both ends of the hydraulic cylinder of the assembly to exhaust, to move the rack so that the carrier is moved away from its second position.

5. A take-out mechanism according to claim 1, wherein the connection made by the second piston rod with the arm comprises a screw-threaded connection of opposite hand to the connection between the first piston rod and the end cap.

6. A take-out mechanism according to claim 1, wherein an adjustable abutment limits the stroke of the piston in the cylinder by engagement with the first piston rod.

* * * * *